(12) United States Patent
Shukla et al.

(10) Patent No.: US 9,080,234 B2
(45) Date of Patent: Jul. 14, 2015

(54) PROCESS FOR THE SURFACE-MODIFICATION OF FLYASH AND INDUSTRIAL APPLICATIONS THEREOF

(75) Inventors: Satyajit Vishnu Shukla, Kerala (IN); Krishna Gopakumar Warrier, Kerala (IN); Baiju Vijayan Kizhakkekilikoodayil, Kerala (IN); Thachan Shijitha, Kerala (IN)

(73) Assignee: COUNCIL OF SCIENTIFIC & INDUSTRIAL RESEARCH (IN)

( * ) Notice: Subject to any disclaimer, the term of this patent is extended or adjusted under 35 U.S.C. 154(b) by 212 days.

(21) Appl. No.: 13/612,363

(22) Filed: Sep. 12, 2012

(65) Prior Publication Data

US 2013/0095995 A1    Apr. 18, 2013

Related U.S. Application Data

(63) Continuation of application No. PCT/IN2010/000735, filed on Nov. 11, 2010.

(30) Foreign Application Priority Data

Mar. 12, 2010 (IN) .............................. 571/DEL/2010

(51) Int. Cl.
| | |
|---|---|
| *C23C 18/18* | (2006.01) |
| *C04B 18/08* | (2006.01) |
| *C04B 20/12* | (2006.01) |
| *C23C 18/12* | (2006.01) |
| *C23C 18/16* | (2006.01) |
| *C23C 18/40* | (2006.01) |
| *C23C 18/44* | (2006.01) |

(52) U.S. Cl.
CPC ........... *C23C 18/1868* (2013.01); *C04B 18/082* (2013.01); *C04B 20/12* (2013.01); *C23C 18/1216* (2013.01); *C23C 18/1245* (2013.01); *C23C 18/1254* (2013.01); *C23C 18/1295* (2013.01); *C23C 18/1601* (2013.01); *C23C 18/1642* (2013.01); *C23C 18/1651* (2013.01); *C23C 18/1658* (2013.01); *C23C 18/1692* (2013.01); *C23C 18/1851* (2013.01); *C23C 18/1879* (2013.01); *C23C 18/1889* (2013.01); *C23C 18/405* (2013.01); *C23C 18/44* (2013.01)

(58) Field of Classification Search
USPC .................. 428/402, 403; 427/212, 123, 125; 252/512, 514; 502/5, 242
IPC ........ C23C 18/1868,18/1642, 18/1692, 18/405, C23C 18/44
See application file for complete search history.

(56) References Cited

U.S. PATENT DOCUMENTS

| | | | | |
|---|---|---|---|---|
| 5,456,840 | A  * | 10/1995 | Tucker et al. | 210/638 |
| 6,261,986 | B1 * | 7/2001  | Bowman et al. | 502/62 |
| 7,056,583 | B2 * | 6/2006  | Stewart | 428/402 |
| 7,309,676 | B2 * | 12/2007 | Mouri et al. | 502/60 |
| 7,510,659 | B2 * | 3/2009  | Rayalu et al. | 210/683 |

* cited by examiner

*Primary Examiner* — Leszek Kiliman
(74) *Attorney, Agent, or Firm* — St. Onge Steward Johnston & Reens LLC (57) ABSTRACT

Processes for the surface-modification of flyash and industrial applications thereof are described in this invention, which involve surface-sensitization, surface-activation, and subsequent Cu or Ag coating of as-received flyash particles in a conventional electroless bath. These new surface-modification processes offer efficient and cost-effective alternatives to conventional processes which modify the surface of flyash particles with a costlier Sn—Pd catalyst-system. Flyash processed with the inventive processes is also suitable for a greater number of industrial applications relative to that processed with the costlier Sn—Pd catalyst-system. The as-received flyash particles, processed via the inventive surface-modification processes, find industrial applications as conductive fillers for manufacturing conducting polymers, paints, adhesives, sealers, and resins used for EMI shielding of electronic devices, in lead-based composites used in the automobile industries, and as a catalyst to purify industrial waste-water by decomposing longer chains of organic molecules into smaller ones.

9 Claims, 12 Drawing Sheets

PROCESS FOR THE SURFACE-MODIFICATION OF FLYASH AND INDUSTRIAL APPLICATIONS THEREOF

CROSS-REFERENCE TO RELATED APPLICATIONS

The present application is a continuation of pending International patent application PCT/IN2010/000735 filed on Nov. 11, 2010 which designates the United States and claims priority from Indian patent application 571/DEL/2010 filed on Mar. 12, 2010, the content of which is incorporated herein by reference.

FIELD OF INVENTION

The present invention relates to a process for the surface-modification of flyash and industrial applications thereof. More particularly, the present invention relates to a process for surface modification of flyash and its industrial applications in conducting polymers, paints, adhesives, sealers, and resins, the lead-based composites used in the automobile industries, and catalysis.

BACKGROUND OF THE INVENTION

The flyash (solid and hollow; also known as cenospheres), the waste byproduct of the thermal power plants, comprising the silica ($SiO_2$), alumina ($Al_2O_3$), and oxides of iron, calcium (CaO), magnesium, and toxic heavy metals such as arsenic, lead, and cobalt, has been environmentally hazardous and pose major disposal problems worldwide. The first major drawback utilizing this waste material is that, innovative value-added products based on the flyash for the industrial applications are currently lacking. The second major drawback in utilizing this waste material is that, the new process for modifying the surface of flyash particles to make them suitable for the industrial applications are limited—(http://edugreen.teri.res.in/explore/air/flyash.htm).

A new electroless method for depositing the conducting metals such as copper (Cu) and silver (Ag) on the surface of flyash particles has been described. The prior art involves adsorbing tin(II)-ions ($Sn^{2+}$) on the surface of flyash particles by stirring them in an acidic aqueous bath of tin(II) chloride ($SnCl_2$) (conventional surface-sensitization bath).

$$SnCl_2 \rightarrow Sn^{2+} + 2Cl^- \quad (1)$$

The surface-sensitized flyash particles are then stirred in an aqueous acidic solution of palladium(II) chloride ($PdCl_2$) (conventional surface-activation bath) to activate the surface of flyash particles with the Pd clusters.

$$Sn^{2+} + Pd^{2+} \rightarrow Pd^0 + Sn^{4+} \quad (2)$$

The surface-activated flyash particles are then stirred in a conventional electroless bath consisting of aqueous basic solution with dissolved metal precursor such as nitrates, sulfates; or chlorides of a metal, a stabilizer such as sodium potassium tartrate ($NaKC_4H_4O_6$), pH controller such as sodium hydroxide (NaOH), and a reducing agent such as formaldehyde (HCHO) to coat Cu or Ag to produce the surface-modified flyash-based products for industrial applications.

$$Cu^{2+} + 2e^- \rightarrow Cu^0 \quad (3)$$

A reference may be made to the deposition of Cu on mica, graphite, $Al_2O_3$, $SiO_2$, and titania ($TiO_2$) particles via conventional electroless process, which Utilize the conventional Sn—Pd catalyst system and Cu as a self-activator (S. Shukla and S. Seal, "Electroless Copper Coating of Zirconia utilizing Palladium Catalyst", J. Am. Ceram. Soc. 86 (2) 279-285 (2003); S. Shulda, S. Seal, Z. Rahman, and K. Scammon, "Electroless Copper Coating of Cenospheres using Silver Nitrate Activator", Mater. Lett. 57, 151-156 (2002); J. Akesson, S. Seal, S. Shulda, and Z. Ralunan, "Copper Plating Process Control by SEM", Adv. Mater. Processes (AMP) 160 (2), 33-35 (2002); S. Shulda, S. Seal, S. Schwarz, and D. Thou, "Synthesis and Characterization of Nanocrystalline Silver Coating of Flyash Cenosphere Particles by Electroless Process", J. Nanosci. Nanotech. 1, 417-424 (2001); S. Shulda, S. Seal, J. Akesson, R. Oder, R. Carter, and Z. Rahman, "Study of Mechanism of Electroless Copper Coating of Fly-Ash Cenosphere Particles", App. Surf. Sci. 181 (1-2) 35-50 (2001).

The third major drawback of the prior art is that, the Conventional Sn—Pd catalyst system is very costly. The forth major drawback of the prior art is that, there exists no alternative mechanism to sensitize the surface of flyash particles to coat them with metals such as Cu and Ag. The fifth major drawback of the prior art is that, there exists no alternative mechanism to activate the surface of flyash particles to coat them with metals such as Cu and Ag. (D. Deonath and P. K. Rohatgi, "Cast Aluminium Alloy Composites Containing Copper-Coated Ground Mica Particles", J. Mater. Sci. 16 (6), 1599-1606 (1981); W. Lu, V. S. Donepudi, J. Prakash, J. Liu, and K. Amine, "Electrochemical and Thermal Behavior of Copper Coated Type MAG-20 Natural Graphite", Electrochim. Acta 47 (10), 1601-1606 (2002); J. F. Silvain, J. L. Bobet, and J. M. Heintz, "Electroless Deposition of Copper onto Alumina Sub-Micronic Powders and Sintering", Composites A 33 (10), 1387-1390 (2002); Y. Kobayashi, Y. Tadaki, D. Nagao, and M. Konno, "Deposition of Gold Nanoparticles on Silica Spheres by Electroless Metal Plating Technique", J. Colloid Interface Sci. 283 (2), 601-604 (2005); K. Gopalcumar, C. Pavithran, and P. K. Rohatgi, "Preparation of Copper Coated Titania Particles for Composites", J. Mater. Sci. 15 (6), 1588-1592 (1980); K. Gopakumar; T. P. Murali, and P. K. Rohatgi, "Metat-Shell Char Particulate Composites using Copper Coated Particles", J. Mater. Sci. 17 (4); 1041-1048 (1982); K. G. K. Warrier and P. K. Rohatgi, "Mechanical, Electrical and Electrical Contact Properties of Copper Titania Composites", J. Powder Metall. 29 (1), 65 (1986).

OBJECTIVES OF THE INVENTION

The main objective of the present invention is to provide process for the surface-modification of flyash and industrial applications thereof.

Yet another objective of the present invention is to modify the surface of flyash particles by sol-gel coating of $TiO_2$ photocatalyst via new surface-sensitization process, which may be used for the industrial applications such as Cu- or Ag-coating of flyash and as a catalyst to purify the industrial waste-water by decomposing longer chains of organic molecules into smaller ones.

Yet another objective of the present invention is to modify the surface of $TiO_2$-coated flyash particles by depositing the metal-clusters such as Cu (self-activator), Ag, Pd, gold (Au), platinum (Pt), or any other noble-metal, via new surface-activation process.

Yet another objective of the present invention is to coat the surface of flyash particles with Cu or Ag via conventional electroless process by using the flyash particles, which are surface-sensitized and surface-activated via new surface-modification process, which may be used for the various industrial applications such as manufacturing of the lead-based composites used in the automobile industries as well as that of the conducting polymers, paints, adhesives, sealers, and resins used for the electromagnetic interference shielding (EMI) of the electronic devices.

SUMMARY OF THE INVENTION

Accordingly, the present invention provides a process for the surface-modification of flyash and industrial applications thereof. In the present invention, the as-received flyash particles are first surface-sensitized by coating these particles with $TiO_2$ via sol-gel utilizing an alkoxide-precursor dissolved in an anhydrous alcohol medium. The surface-sensitized flyash particles are then surface-activated by depositing the metal-clusters ('M'), where 'M' may be Cu, Ag, Pd, Au, Pt, or any other noble-metal, via stirring the surface-sensitized particles in a basic aqueous solution containing the metal-ions under the continuous ultraviolet (UV) radiation exposure. Cu or Ag is then coated on the surface-activated flyash particles using the conventional electroless bath.

In one embodiment of the present invention, a process for the surface-modification of flyash, wherein said process comprising the steps of:

i. stirring flyash particles (10-50 g.$^{-1}$) in an anhydrous 2-propanol solution (100-500 ml) of titanium (IV) propoxide ($Ti(OC_3H_7)_4$) (0.01-1.0 M) in the surface-sensitization bath;

ii. simultaneously preparing the solution of anhydrous 2-propanol (100-500 ml) and water, wherein the final ratio of molar concentration of water to that of $Ti(OC_3H_7)_4$ is in the range of 2 to 15;

iii. adding drop wise the solution prepared in step (ii) to the suspension prepared in step (i), wherein the final ratio of 2-propanol to flyash is in the range of 25-100 ml·g$^{-1}$;

iv. stirring the suspension as obtained in step (iii) for 2-6 h;

v. separating the particles from the solution as obtained in step (iv) via filtration and drying in an oven at 80-90° C. for 10-12 hours to obtain the amorphous-$TiO_2$ coated flyash particles;

vi. calcining the amorphous-$TiO_2$ coated flyash particles as obtained in step (v) at temperature ranging between 400-600° C. for a period ranging between 1-4 hours to obtain the crystalline-$TiO_2$ coated flyash particles;

vii. stirring the surface-sensitized flyash particles as obtained in step (vi) in an aqueous solution of metal-salt at pH~10-12 obtained using an aqueous $NH_4OH$ solution (25-28 wt. %) in the surface-activation bath;

viii. stirring the suspension as obtained in step (vii) continuously under the UV, visible or solar radiation for a period ranging between 4-6 hours to deposit the clusters of metal over the surface-sensitized flyash particles;

ix. separating the surface-activated flyash particles as obtained in step (viii) via filtration followed by washing with distilled water several times to remove the unwanted ions from the surface;

x. stirring the surface-activated flyash particles, as obtained in step (ix) in a conventional electroless coating bath containing an aqueous solution of sodium hydroxide (NaOH) (5-15 g·L$^{-1}$), sodium potassium tartrate ($NaKC_4H_4O_6$) (30-60 g·L$^{-1}$) and a metal-salt (1-10 g·L$^{-1}$);

xi. adding slowly 30-40 wt. % formaldehyde (HCHO) (5-20 ml·L$^{-1}$) as a reducing agent into the solution as obtained in step (x);

xii. stirring the suspension as obtained in step (xi) continuously till the initial dark blue solution fades in color or becomes completely transparent;

xiii. separating the metal-coated flyash particles from the suspension as obtained in step (xii) via filtration and drying in an oven at 80-100° C. for 10-12 hours to obtain surface-modified flyash.

In still another embodiment of the present invention, the method to deposit $TiO_2$ on the surface of flyash particles for the surface-sensitization is selected from the group consisting of wet-chemical process including co-precipitation, sol-gel, hydrothermal, and microemulsion; or any physical process including sputtering, chemical vapor deposition, and thermal evaporation.

In still another embodiment of the present invention, wherein the sol-gel method is preferred to deposit $TiO_2$ on the surface of flyash particles.

In still another embodiment of the present invention, the presence of $TiO_2$ coating on the surface of flyash particles is Confirmed by measuring and comparing the photocatalytic activity of the as-received and surface-sensitized flyash particles, involving the degradation rate of methylene blue (MB) dye in an aqueous solution under the UV-radiation exposure, which is taken as a measure of the amount of $TiO_2$ deposited via sol-gel.

In still another embodiment of the present invention, the metal-salt for the surface activation process is selected from the group consisting of nitrate, chloride or sulfate salts of Cu, Ag, Pd, Au, Pt, or any other noble-metal.

In still another embodiment of the present invention, Cu and Ag metal-salts are preferred for surface-activation.

In yet another embodiment of the invention, Cu and Ag metal salts ($CuSO_4$ and $AgNO_3$) are preferred for the Cu and Ag coating in a conventional electroless bath.

In still another embodiment of the present invention, the concentration of metal-salt in step (vii) is in the range of 0.1-1.0 g·L$^{-1}$.

In still another embodiment of the present invention, wherein the radiation used in step (viii) is UV ($\lambda$=200-400 nm), visible ($\lambda$=400-800 nm), or sunlight ($\lambda$=200-800 nm).

In still another embodiment of the present invention, a surface-modified flyash as obtained in step (xiii) comprises (a) flyash particles; (b) photocatalyst (10-40 wt. %) for surface-sensitization, selected from the group consisting of zinc oxide (ZnO), tin oxide ($SnO_2$), titania ($TiO_2$), zinc sulfide (ZnS); cadmium sulfide (CdS), or any other semiconductor material; (c) metal-clusters (0.1-3.0 wt. %) for surface-activation, deposited over the surface-sensitized flyash particles, selected from the group consisting of Cu, Ag, Pd, Au, Pt, or any other noble-metal, and (d) a Metal-coating (1.0-10 wt. %) selected from the group consisting of Cu and Ag.

In still another embodiment of the present invention, the surface-modified flyash, wherein the flyash particles consist of the mixture of $SiO_2$ (40-50 wt. %), $Al_2O_3$ (40-50 wt. %), CaO (1-3 wt. %) and $TiO_2$ (2-4 wt. %).

In still another embodiment of the present invention, the surface-modified flyash, wherein the flyash particles are either solid or hollow (cenosphere).

In still another embodiment of the present invention, the surface-modified flyash, wherein $TiO_2$ is preferred as photocatalys for surface sensitization.

In still another embodiment of the present invention, the surface-modified flyash is used as a catalyst to purify the industrial waste-water by decomposing longer chains of organic molecules into smaller ones.

In still another embodiment of the present invention, the surface-modified flyash is used for the industrial applications such as manufacturing conducting polymers, paints, adhesives, sealers, and resins used for the EMI shielding of the electronic devices, and in the lead-based composites used in the automobile industries.

In still another embodiment of the present invention, the changes in the surface-morphology, surface-chemistry and surface-structure of the flyash particles undergoing the new surface-modification process have been monitored via scanning electron microscope (SEM), energy dispersive analysis of X-rays (EDX), X-ray photoelectron spectroscope (XPS), and X-ray diffraction (XRD).

In still another embodiment of the present invention, the surface-modified flyash is electrically conducting whereas the as-received flyash is electrically non-conducting.

BRIEF DESCRIPTION OF THE FIGURES

FIGS. 11(a) and (b) represent typical SEM images of one of the spherical-shaped as-received and Cu-coated flyash particles. The Cu-coated flyash particle is obtained after stirring the surface-sensitized (R=2 and T=600° C.) and surface-activated (using Ag) flyash particles in the conventional electroless bath. (c) Typical EDX analysis of the Cu-coated flyash particle as shown in (b).

DETAILED DESCRIPTION OF THE INVENTION

Figure 1:
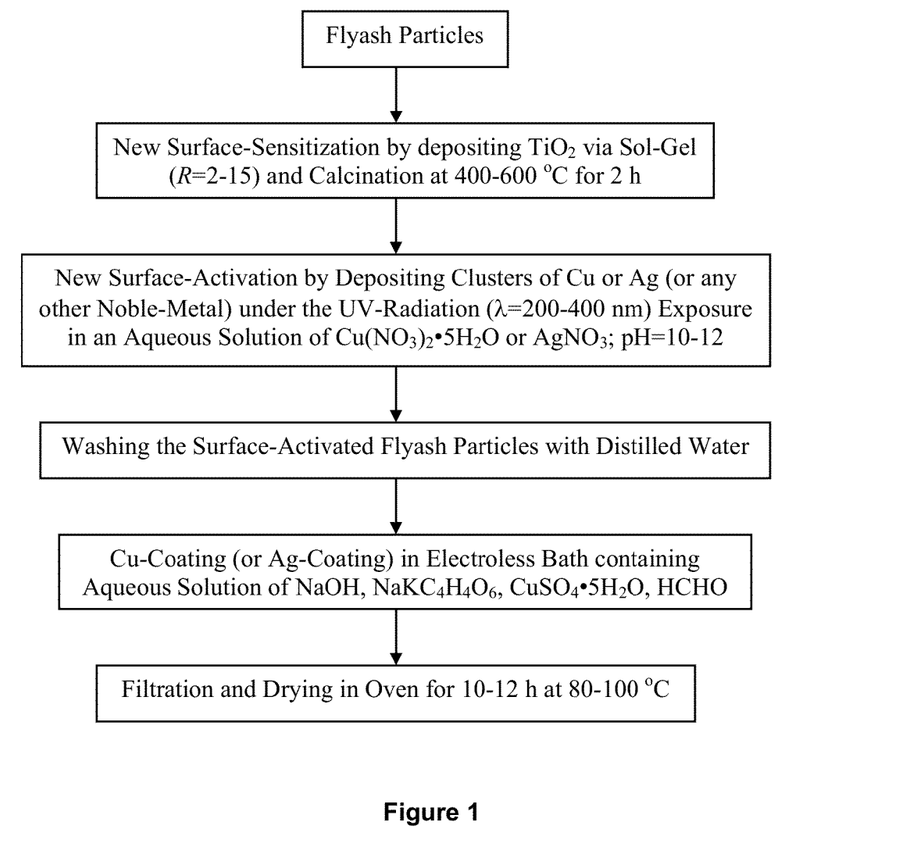
FIG. 1 represents the block-diagram describing the new surface-modification process involving the new surface-sensitization and surface-activation methods to coat the surface of flyash particles with the metals such as Cu or Ag in the conventional electroless bath. 'R' is defined as the ratio of molar concentration of water to that of $Ti(OC_3H_7)_4$.
Figure 9:
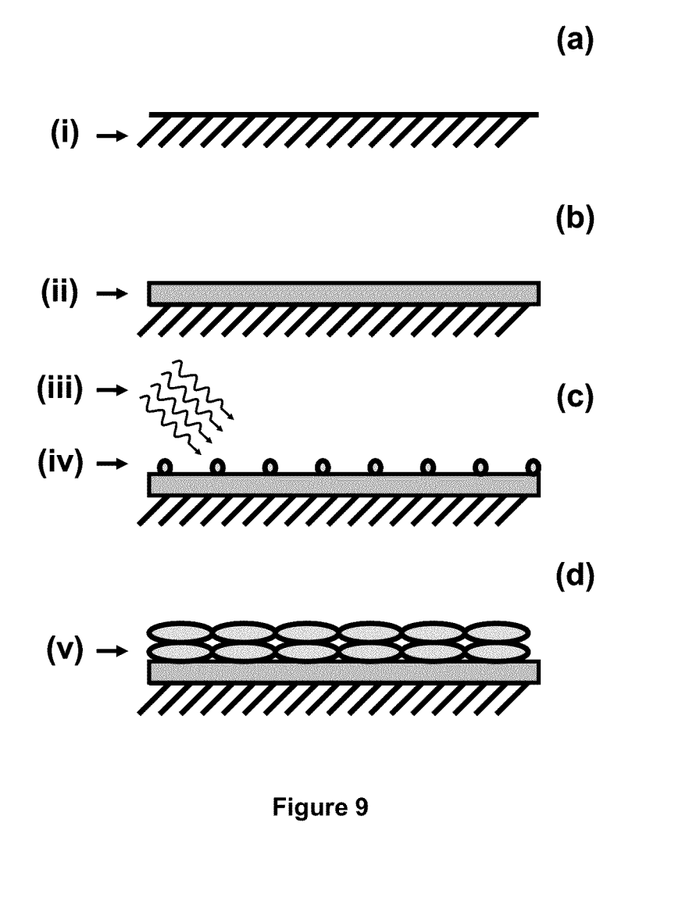
FIG. 9 represents a schematic diagram giving the pictorial presentation of the new surface-modification process involving the new surface-sensitization and surface-activation process to coat the surface of flyash particles with Cu or Ag in an electroless bath. (i) As-received flyash particle surface; (ii) sol-gel $TiO_2$ coated-surface of flyash particle (new surface-sensitization process); (iii) UV-radiation; (iv) deposition or metal-clusters ('M', where 'M' may be Cu, Ag, Pd, Au Pt, or any other noble-metal) under the continuous UV-radiation exposure (new surface-activation process); (v) Cu-coating formed as a result of the deposition of Cu-species after stirring the surface-activated flyash particles in the conventional electroless bath.

The present invention provides a surface-modification process for flyash, as described in the block diagram presented in FIG. 1, and industrial applications thereof. The process comprises sensitizing the surface of 10-50 g·L$^{-1}$ of flyash particles via stirring them in the surface-sensitization bath, in which anhydrous 100-500 ml of 2-propanol solution of 0.01-1.0 M titanium(IV) iso-propoxide and 100-500 ml of 2-propanol-water solution (R=2-15, wherein the ratio of molar concentration of water to that of $Ti(OC_3H_7)_4$ is represented by 'R'), are mixed drop wise. The resulting suspension is stirred for 2-6 h. The particles are then separated from the solution via filtration and dried at 80-90° C. for 10-12 h in an oven. The amorphous-$TiO_2$ coated flyash particles are then calcined at 400-600° C. for 1-4 h to obtain the crystalline-$TiO_2$ coated flyash particles as shown in FIG. 9b.

The surface-sensitized flyash particles are then surface-activated via stirring in surface-activation bath containing an aqueous solution of 0.1-1.0 g·L$^{-1}$ copper (II) nitrate trihydrate ($Cu(NO_3)_2·3H_2O$) or silver nitrate ($AgNO_3$) at pH~10-12 obtained using an aqueous $NH_4OH$ solution. The suspension is stirred continuously under the UV (λ=200-400 nm), visible (λ=400-800 nm), or solar-radiation (λ=200-800 nm) exposure for 4-6 h to deposit the clusters of Cu or Ag on the surface of flyash particles. The surface-activated flyash particles are separated via filtration and washed with water several times to remove the unwanted ions from the surface as shown in FIG. 9c.

To coat Cu (or Ag), the new surface-activated flyash particles are stirred in the conventional electroless bath containing an aqueous solution of NaOH (5-15 g·L$^{-1}$), $NaKC_4H_4O_6$ (30-60 g·L$^{-1}$), and copper(II) sulfate pentahydrate ($CuSO_4·5H_2O$, 1-10 g·L$^{-1}$). To this suspension, 5-20 ml·L$^{-1}$ of 30-40 wt. % HCHO is slowly added as a reducing agent. The resulting suspension is stirred continuously till the initial dark blue solution fades in color or becomes completely transparent. The Cu-coated flyash particles are then separated via filtration and then dried in an oven at 80-100° C. overnight as shown in FIG. 9d.

The following examples are given to illustrate the process of the present invention and should not be construed to limit the scope of the present invention.

EXAMPLE-1

In this example, $Ti(OC_3H_7)_4$ and anhydrous 2-propanol are purchased from Alfa Aesar, India; $NH_4OH$ (Assay 25-28 wt. %), $NaKC_4H_4O_6$, and silver nitrate ($AgNO_3$) from S.D. Fine Chemicals Ltd., India; $Cu(NO_3)_2.3H_2O$ from CDH Analytical Reagent, India; NaOH (Assay 97%) from Hi Media Laboratories, India; $CuSO_4.5H_2O$ (Assay 98.5%) from Nice Laboratory Reagent, India; and HCHO (37-41 w/v %) from Nice Chemicals, India. Flyash particles in the powder form are obtained from the Unicorn Thermal Power Plant, Tamil Nadu, India. All chemicals and powders are used as-received without any further purification. 5.0 g of flyash particles are stirred in the new surface-sensitization bath consisting 125 ml of anhydrous 2-propanol solution of 0.1 M (final concentration) $Ti(OC_3H_7)_4$. To this suspension, 125 ml of 2-propanol and water (R=2) solution is added drop wise and the resulting suspension is stirred for 4 h. The particles are then separated from the solution via filtration and dried at 80° C. for 12 h in an oven. The amorphous-$TiO_2$ coated flyash particles are then calcined at 400° C. for 2 h to obtain the crystalline-$TiO_2$ coated flyash particles. The surface-sensitized flyash particles are then surface-activated via stirring in the new surface-activation bath containing an aqueous solution of 0.48 g·L$^{-1}$ $Cu(NO_3)_2.3H_2O$ at pH~10.5 obtained using an aqueous $NH_4OH$ solution. The suspension is stirred continuously under the UV-radiation ($\lambda$=200-400 nm) exposure for 4 h to deposit Cu as a self-activator on the surface of flyash particles. The surface-activated particles are separated via filtration and washed with distilled water several times to remove the unwanted ions from the surface. The surface-activated flyash particles are then stirred in the conventional electroless bath containing an aqueous solution of NaOH (10 g·L$^{-1}$), $NaKC_4H_4O_6$ (50 g·L$^{-1}$), and $CuSO_4.5H_2O$ (4.0 g·L$^{-1}$). To this suspension, 12 Ml·L$^{-1}$ of HCHO is slowly added as a reducing agent and the resulting suspension is stirred continuously till the initial dark blue solution faded in color or became completely transparent. The Cu-coated flyash particles are then separated via filtration and then dried in an oven at 80° C. overnight.

The surface-morphology and size-distribution of as-received and Cu-coated flyash particles are determined using the SEM (JEOL JSM-5600LV, Japan) operated at 15 kV; while, the bulk chemical constituents are determined using the EDX analysis. The various phases present in the as-received and Cu-coated flyash particles are identified using the XRD (Phillips, Japan). The broad-scan XRD analysis was typically conducted within the 2-θ range of 10-80° using the Cu Kα X-radiation ($\lambda$=1.542 Å). The changes in the surface-chemistry of flyash particles, undergoing the new surface-sensitization and surface-activation processes, are monitored using the XPS (VG Micro Tech ESCA 3000, United Kingdom) at the base pressure of $10^{-9}$ Torr using the Mg Kα X-radiation (1253.6 eV, linewidth 0.7 eV) at the power of 200 W. Small amount of flyash particles is removed after each step for the XPS analysis to understand the process of Cu-coating of flyash particles. Both the survey and high-resolution narrow spectra are recorded with the electron pass energy of 50 eV and the take-off angle of 55° to achieve the maximum spectral resolution. Narrow and high-resolution scans are conducted for Ti (2p) and Cu $2p_{3/2}$ to understand the variation in the oxidation states of these elements during the new surface-modification process. The narrow-scans are deconvoluted using the peak-fit software (XPSPEAK 41) to reveal the different species of Ti and Cu existing on the flyash particle surface. The binding energy (BE) of Au $4f_{7/2}$ at 84.0±0.1 eV is used to calibrate the BE scale of the spectrometer. Any charging shifts produced by the samples are carefully removed using a BE scale referred to C (1s) BE of the hydrocarbon part of the adventitious carbon line at 284.6 eV. Non-linear least-square curve-fitting is performed using a Gaussian/Lorentzian peak shape after the background removal.

To confirm the presence of $TiO_2$ coating after the surface-sensitization of flyash particles, the photocatalytic activity of the as-received and surface-sensitized flyash particles is studied by monitoring the degradation of MB dye in an aqueous solution containing different powder particles, under the continuous stirring and exposure to the UV-radiation ($\lambda$=200-400 nm). In 75 ml of distilled water, 7.5 μmol·L$^{-1}$ of MB dye is completely dissolved. Then, 0.4 g·L$^{-1}$ of as-received and surface-sensitized flyash particles are dispersed to prepare two different suspensions. The suspensions are equilibrated by stirring in the dark (without an exposure to any radiation) for 1 hour to stabilize the surface-adsorption of the MB dye.

The stable aqueous suspension is irradiated with the UV-light, under the continuous magnetic stirring, using the Rayonet Photoreactor (The Netherlands) containing 15 W tubes (Philips G15 T8) as the UV-source, which emitted the UV-radiation within the wavelength range of 200-400 nm corresponding to the photon energy range of 3.07-6.14 eV. Following the UV-radiation exposure, 3 ml of aqueous suspension is taken out of the UV-chamber for each 30 min time interval for total 150 min of UV-radiation exposure for obtaining the UV-visible absorption spectrum.

The particles are filtered out from the sample suspension using a centrifuge (R23, Remi Instruments India Ltd.) and the filtrate is examined using a UV-visible spectrometer (Shimadzu, UV-2401 PC, Japan) to study the degradation of MB dye. The absorption spectra of the MB dye solution are obtained within the range of 200-800 nm as a function of the UV-radiation exposure time. The intensity of the absorbance peak (A) of the MB dye solution, located at 656 nm, is taken as a measure of the residual concentration of the MB dye (C). The UV-visible absorption spectrum of the MB dye solution without the addition of powder particles, prior to the UV-radiation exposure, is also recorded as a reference spectrum corresponding to the initial MB dye concentration ($C_0$). The normalized residual MB dye concentration is then obtained using the relationship of the form, $$\left(\frac{C}{C_0}\right)_{MB} = \left(\frac{A_{time=t}}{A_{time=0}}\right)_{656\ nm} \tag{4}$$

A photocatalysis experiment, without any addition of powder particles, is also performed to confirm the stability of the MB dye under the UV-radiation exposure in the absence of flyash particles. Under this condition, the initial MB dye concentration ($C_0$) remains unchanged even after irradiating the sample for total 150 min.

Figure 2:
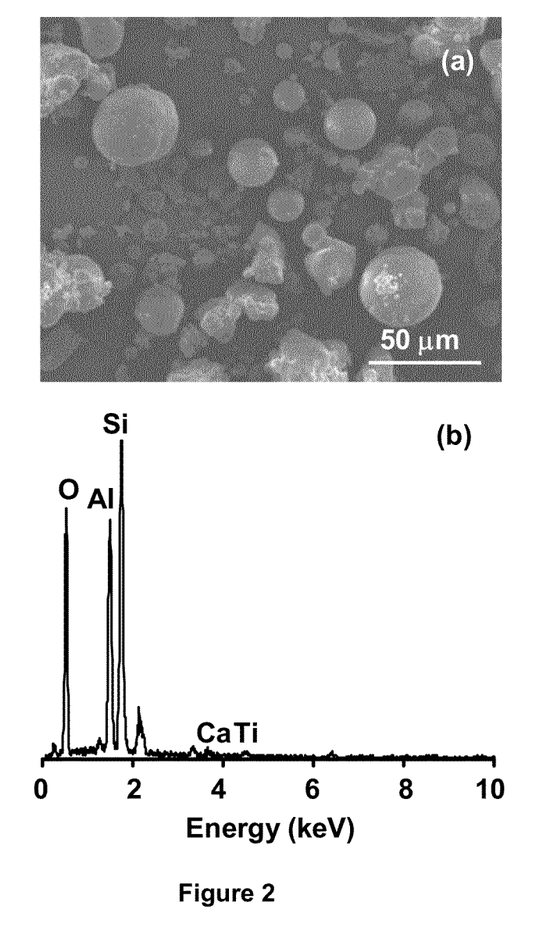
FIG. 2 represents typical SEM image (a) and EDX analysis (b) of the as-received flyash particles. Flyash particles are made up of mixture of oxides such as $SiO_2$ (40-50 wt. %), $Al_2O_3$ (40-50 wt. %), CaO (1-3 wt. %), and $TiO_2$ (2-4 wt. %).
Figure 3:
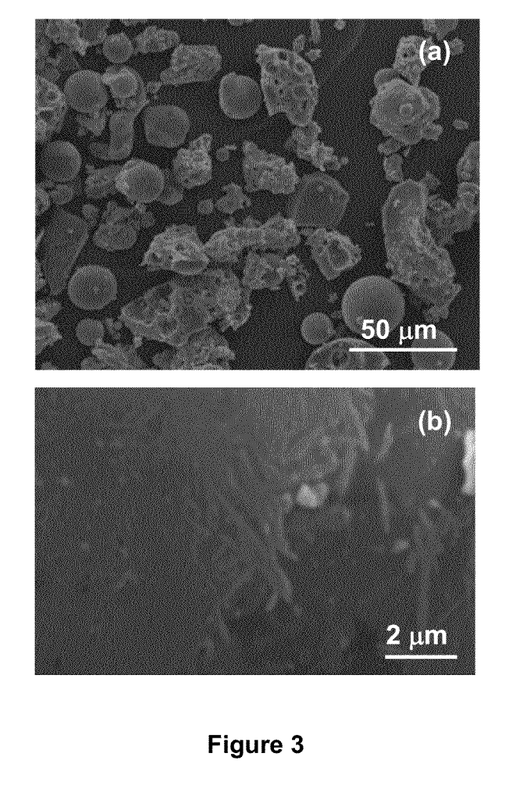
FIG. 3 represents typical SEM images of Cu-coated flyash particles at lower (a) and higher (b) magnifications after stirring the surface-sensitized (R=2 and T=400° C.) and surface-activated (Cu as a self-activator) flyash particles in an electroless bath. In (b), rod-like growth of Cu-species is seen.

Typical SEM micrograph of as-received flyash particles is presented in FIG. 2(a). Both non-spherical and spherical-shaped particles are seen in the SEM image. The size of spherical-shaped particles is estimated to be within the range of 5-40 μm. The EDX analysis of one of the spherical-shaped particle is presented in FIG. 2(b). It appears that, the as-received flyash particles mainly contain $Al_2O_3$ (48.0 wt. %) and $SiO_2$ (48.0 wt. %) with the trace amount of CaO, (1.4 wt. %) and $TiO_2$ (2.6 wt. %). The SEM image of the Cu-coated flyash particles is shown in FIG. 3(a). At higher magnification, FIG. 3(b), a rod-like morphology (length ~2 μm and width ~100-200 nm) of the Cu-coating is clearly seen, which is not observed for the as-received flyash particles.

Figure 4:
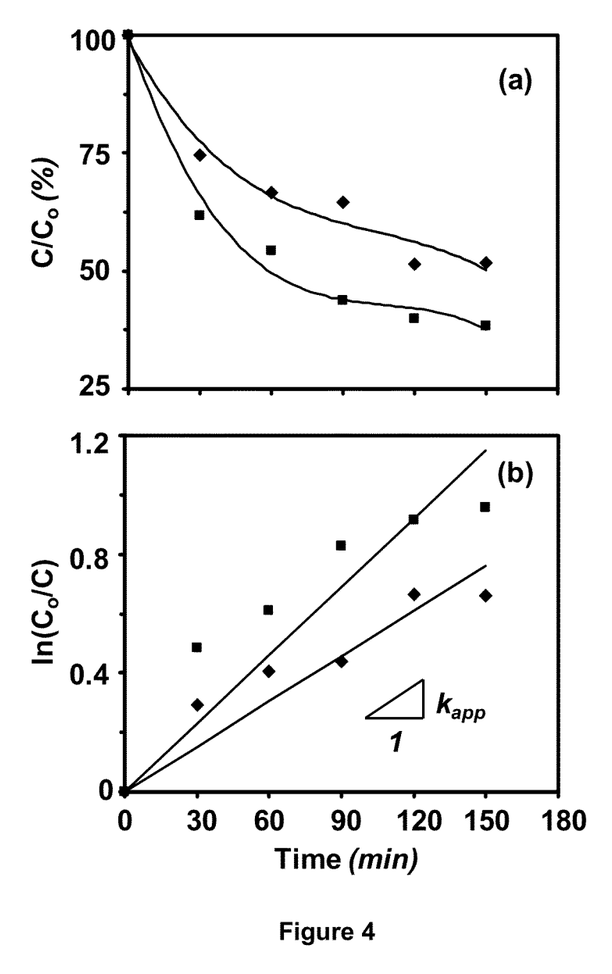
FIG. 4 represents typical variation in the normalized residual MB dye concentration as A function of UV-radiation exposure time (a) and plots for determining the apparent first-order reaction rate-constant ($k_{app}$) (b) for the as-received (□) and surface-sensitized (■) (R=2 and T=400° C.) flyash particles.

The variation in the normalized residual MB dye concentration as a function of UV-radiation exposure time, as obtained for the as-received and surface-sensitized flyash particles, is presented in FIG. 4(a); while, the corresponding plots obtained for determining the $k_{app}$ have been presented in FIG. 4(b). It is observed that, the as-received flyash particles exhibit photocatalytic activity for the degradation of MB dye in an aqueous solution under the UV-radiation exposure. The photocatalytic activity of the surface-sensitized flyash particles is noted to be higher than that of the as-received flyash particles. The $k_{app}$ has been estimated to be 0.005 min$^{-1}$ and 0.008 min$^{-1}$ for the as-received and surface-sensitized flyash particles. Thus, the sol-gel coating of $TiO_2$ on the surface of as-received flyash particles enhances its photocatalytic activity. Thus, the photocatalytic experiment confirms the successful $TiO_2$ coating on the surface of flyash particles after stirring them in the new surface-sensitization bath.

Figure 5:
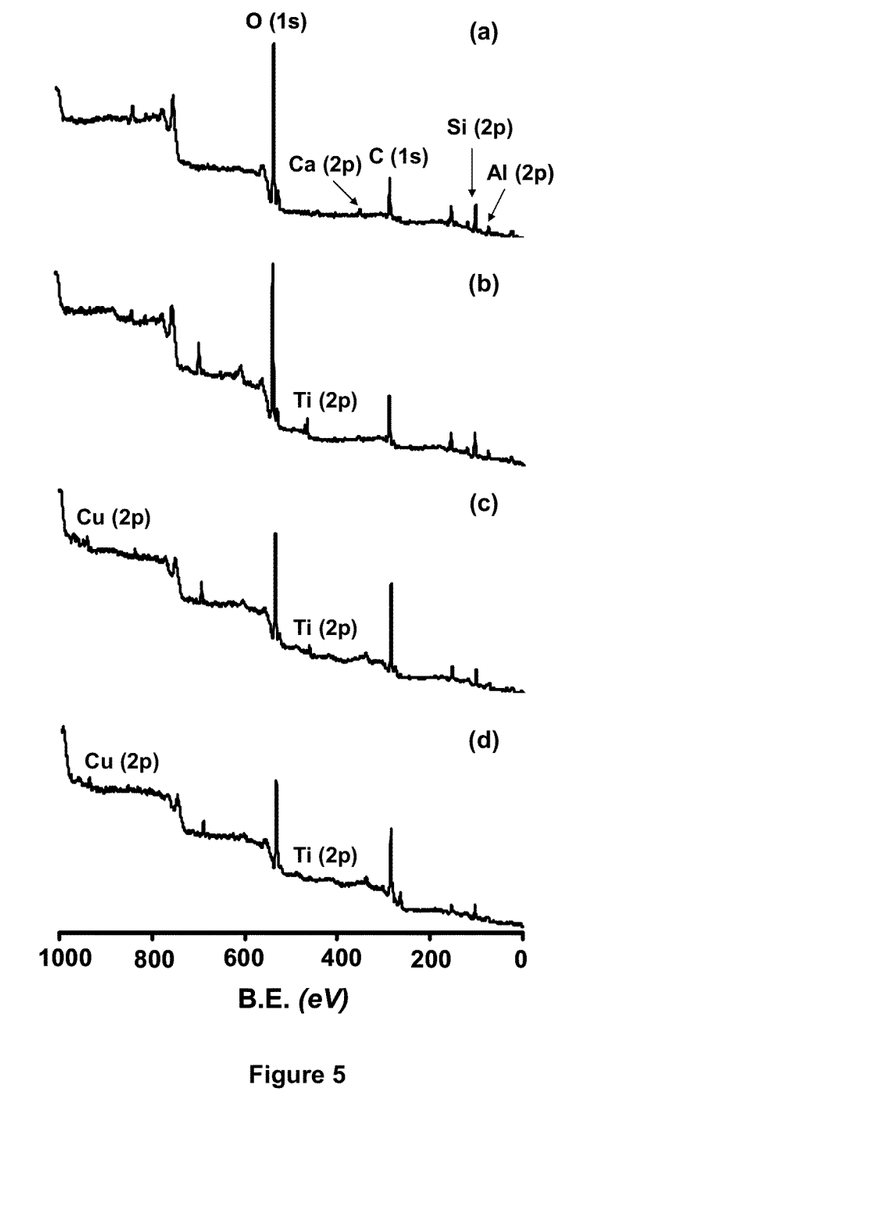
FIG. 5 represents the broad-scan XPS analysis of the surface of flyash particles undergoing the new surface-sensitization and surface-activation steps. (a) as-received; (b) surface-sensitized (R=2 and T=400° C.); (c) surface-activated (Cu as a self-activator); and (d) Cu-coated flyash particles.

The broad-scan XPS analyses of the surface of flyash particles after the new surface-sensitization, surface-activation, and electroless Cu-coating processes are shown in FIG. 5. In FIG. 5(a), the broad-scan spectrum, obtained from the surface of as-received flyash particles, reveals the presence of Al, Si, Ca, and O species with the corresponding Al (2p), Si (2p), Ca (2p), and O (1s) peaks located at the BE levels of 74.6, 103.4, 347.5, and 532.0 eV respectively. This suggests that, the surface of as-received flyash is primarily composed of mixed oxides of $Al_2O_3$, $SiO_2$, and CaO. After the new surface-sensitization step, FIG. 5(b), an additional peak corresponding to Ti (2p) is visible at the BE level of 459 eV. This suggests that, the flyash particles are coated with $TiO_2$ after stirring the particles in the new surface-sensitization bath, which is in agreement with the photocatalysis experiment, FIG. 4.

The surface-sensitized flyash particles, when stirred in the new surface-activation bath, show the presence of Cu (2p) peak at 935 eV, FIG. 5(c), which suggests the presence of Cu-species on the surface of flyash particles. Comparison of FIGS. 5(b) and 5(c) shows reduction in the intensity of Ti (2p) peak, after the new surface-activation step, which accompanies the deposition of Cu on the flyash particle surface. The surface-activated flyash particles, after stirring in an electroless bath, show an increase in the intensity of Cu (2p) peak with the simultaneous decrease in the intensity of Ti (2p) peak, FIG. 5(d).

Figure 6:
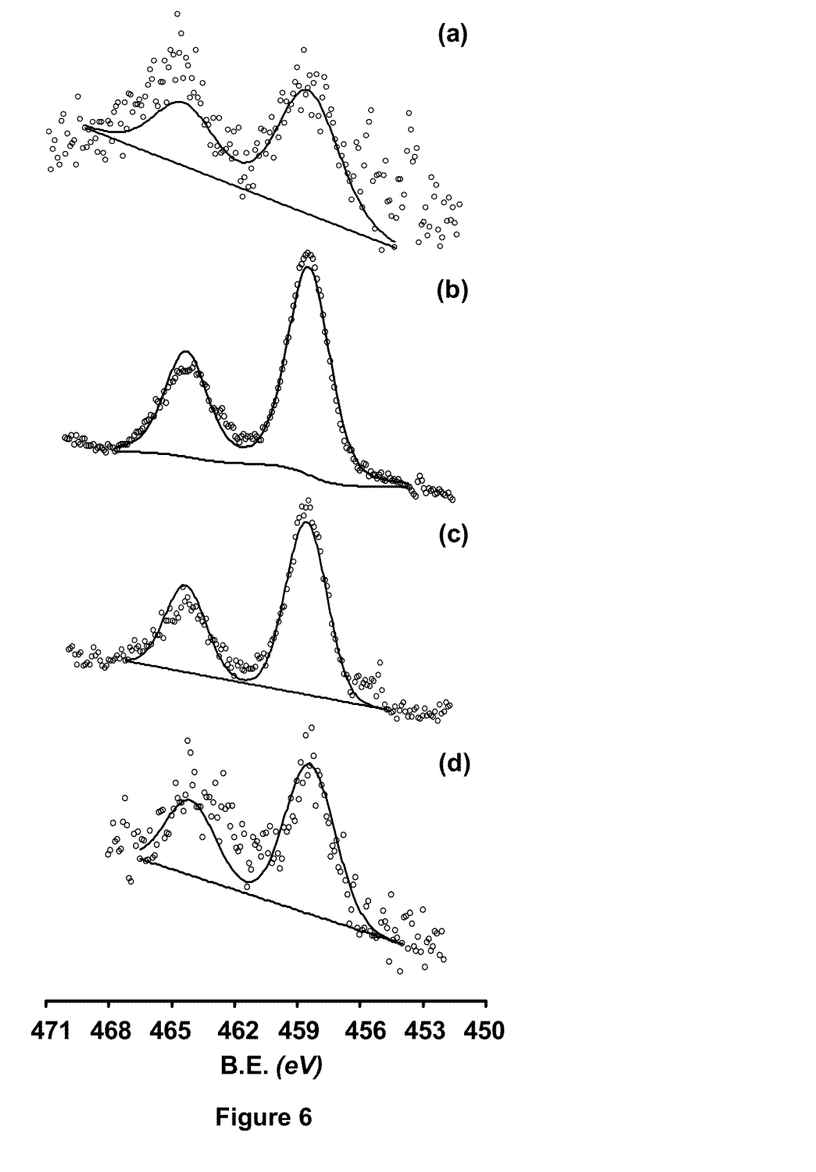
FIG. 6 represents the deconvoluted XPS narrow-scan Ti (2p) spectra obtained using the flyash particles undergoing the new surface-sensitization and surface-activation steps. (a) as-received; (b) surface-sensitized (R=2 and T=400° C.); (c) surface-activated (Cu as a self-activator); and (d) Cu-coated flyash particles.

The narrow-scan XPS analyses for Ti (2p) within the BE interval of 452-471 eV, for the flyash particles undergoing the new surface-sensitization and surface-activation process, are presented in FIG. 6. For the as-received, surface-sensitized, surface-activated, and Cu-coated flyash particles, Ti $2p_{3/2}$ BE level is observed at 459.1, 458.5, 458.3, and 457.9 eV respectively, which suggests the presence of $TiO_2$ on the surface of flyash particles. Variation in the intensity of Ti $2p_{3/2}$ peak after different processing steps is also noted in FIG. 6. It appears that, although Ti (2p) peak is not detected in the broad-scan analysis, FIG. 5(a), the narrow-scan analysis does suggest the presence of trace amount of $TiO_2$ on the surface of as-received flyash particles, FIG. 6(a). The intensity of Ti $2p_{3/2}$ peak, however, increases after stirring the as-received flyash particles in the new surface-sensitization bath, FIG. 6(b), which is in accordance with the broad-scan analysis, FIG. 5(b), and the photocatalysis experiment, FIG. 4. After stirring the surface-sensitized flyash particles in the new surface-activation bath under the UV-radiation exposure, FIG. 6(c), and subsequently in the conventional electroless bath, FIG. 6(d), progressive reduction in the intensity of Ti $2p_{3/2}$ peak is noted, which is also in agreement with the broad-scan analyses, FIGS. 5(c) and 5(d).

Figure 7:
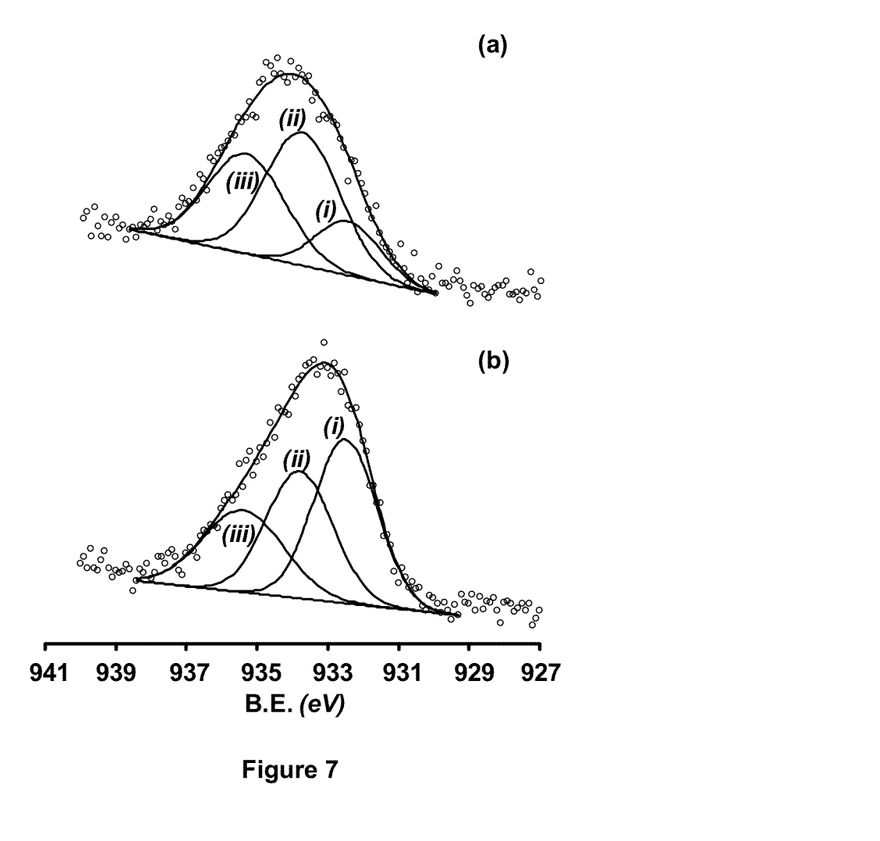
FIG. 7 represents the deconvoluted XPS narrow-scan Cu $2p_{3/2}$ spectra obtained using the flyash particles undergoing the new surface-modification process. (a) surface-activated (Cu as a self-activator) and (b) Cu-coated flyash particles. In (a) and (b), (i) $Cu^0$; (ii) CuO; and (iii) $Cu(OH)_2$.

The narrow-scan XPS analyses for the Cu $2p_{3/2}$ peak within the BE interval of 927-940 eV, as obtained after stirring the surface-sensitized flyash particles in the new surface-activation bath under the UV-radiation exposure and in the conventional electroless bath, are presented in FIGS. 7(a) and 7(b). The deconvolution of Cu $2p_{3/2}$ spectra reveals the presence of three sub-peaks located at the BE levels of 932.7, 933.8, and 935.1 eV, which may be related to $Cu^0$, CuO, and $Cu(OH)_2$ species present on the surface of flyash particles. For the surface-activated flyash particles, FIG. 7(a), the relative amount of CuO appears to be larger than that of $Cu^0$ and $Cu(OH)_2$. However, after stirring the surface-activated particles, in the conventional electroless bath, the amount of $Cu^0$ increases relative to that of CuO and $Cu(OH)_2$. Thus, the broad-scan and narrow-scan XPS analyses confirm the successful Cu-coating of as-received flyash particles via new surface-sensitization and surface-activation processes.

Figure 8:
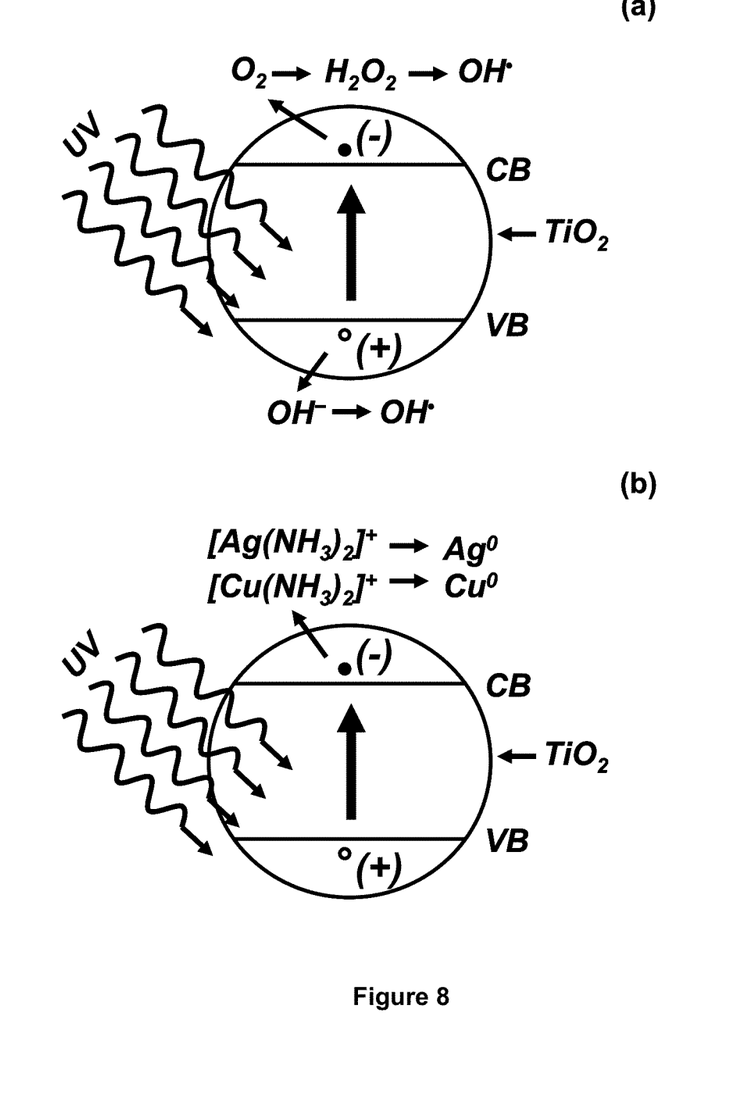
FIG. 8 represents the mechanism of photocatalysis using the semiconductor $TiO_2$ under the UV-radiation exposure (a) and the proposed mechanism of using the sol-gel processed $TiO_2$ as a new surface-sensitizer for the subsequent surface-activation and Cu-coating of flyash particles (b).

$TiO_2$, being a semiconductor with a wide band gap (~3.0-3.2 eV), requires the UV-radiation exposure of appropriate wavelength to generate the electron-hole pairs. If the life-time of UV-generated electron-hole pairs is high, then they may escape to the particle surface and take part in the redox reactions. This mechanism is conventionally utilized in the photocatalysis using $TiO_2$ for the degradation of longer chains of organic molecules, present in air or water, into smaller ones via formation and subsequent attack of OH-radicals, as described schematically in FIG. 8(a). On contrary, in this example of the invention, the electron-hole pairs generated in the semiconductor $TiO_2$, under the UV-radiation exposure, have been utilized to surface-activate the flyash particles with the Cu-clusters by reducing the intermediate Cu-complexes such as $[Cu(NH_3)_2]^+$, FIG. 8(b).

$$[Cu(NH_3)_2]^+ + e^- \rightarrow Cu^0_{(ads)} + 2NH_{3(aq)} \qquad (5)$$

Thus, in this new process of surface-activation, the sol-gel coated $TiO_2$ photocatalyst is effectively utilized as a new surface-sensitizer, under the UV-radiation exposure, and $Cu^0$ as a self-activator for obtaining the Cu-coating of flyash particles in the conventional electroless bath.

The overall mechanism of Cu-coating of as-received flyash particles, via new surface-sensitization and surface-activation processes, is summarized in FIG. 9. The as-received flyash particles are first surface-sensitized in the new surface-sensitization bath for obtaining the sol-gel coated crystalline-$TiO_2$, FIGS. 9(a) and 9(b), with the R-value of 2 and the calcination temperature of 400° C. As a result, when the surface-sensitized flyash particles are stirred in the new surface-activation bath under the UV-radiation exposure, they generate electron-hole pairs within the sol-gel coated semiconductor-$TiO_2$ via Mechanism described in FIG. 8. The generated electrons are then effectively utilized to reduce the intermediate Cu-complex to $Cu^0$, equation 5, which are subsequently deposited on the surface of flyash particles. Along with $Cu^0$, CuO and $Cu(OH)_2$ are also formed on the surface of flyash particles during the new surface-activation step. The Cu-species are possibly deposited in the form of clusters during the surface-activation step, FIG. 9(c), since the $TiO_2$ located below this layer could be detected, in the broad-scan XPS analysis (FIG. 5(c)). In the conventional electroless bath, more $Cu^0$ is deposited on the surface of flyash particles, in a rod-like morphology, FIG. 3(b), making the Cu-coating more continuous, FIG. 9(d), which in turn reduces the amount of $TiO_2$ detected in the XPS analysis (FIG. 5(d)).

In conclusion, in this example, the new methods of surface-sensitization and surface-activation have been successfully demonstrated to coat the surface of flyash particles with Cu via conventional electroless process using Cu as a self-activator.

EXAMPLE-2

In this example, 5.0 g of as-received flyash particles are stirred in the 125 ml of anhydrous 2-propanol solution of 0.1 M (final concentration) $Ti(OC_3H_7)_4$. To this suspension, 125 ml of 2-propanol and water solution is added drop wise. Two different suspensions are prepared with different R-values (2 and 5) for comparison. The resulting suspension is stirred for 4 h and the particles are then separated from the solution via filtration and dried at 80° C. for 12 h. The amorphous-$TiO_2$ coated flyash particles are then calcined at 600° C. for 2 h to obtain the crystalline-$TiO_2$ coated flyash particles. The surface-sensitized flyash particles are then surface-activated via stirring in the new surface-activation bath containing an aqueous solution of 0.48 g·L$^{-1}$ $AgNO_3$ at pH~10.5 obtained using an aqueous $NH_4OH$ solution: The suspension is stirred continuously under the UV-radiation ($\lambda$=200-400 nm) exposure for 4 h to deposit Ag as an activator on the surface of flyash particles. The surface-activated flyash particles are separated via filtration and washed with water several times to remove the unwanted ions from the surface. The surface-activated flyash particles are then stirred in the conventional electroless bath containing an aqueous solution of NaOH (10 g·L$^{-1}$), $NaKC_4H_4O_6$ (50 g·L$^{-1}$), and $CuSO_4$·$5H_2O$ (4.0 g·L$^{-1}$). To this suspension, 12 ml·L$^{-1}$ of HCHO is slowly added as a reducing agent and the resulting suspension is stirred continuously till the initial dark blue solution faded in color or became completely transparent. The Cu-coated flyash particles are then separated via filtration and then dried in oven at 80° C. overnight.

In this example, during the new surface-sensitization step, the amorphous-$TiO_2$ coated flyash particles are calcined 600° C., which is slightly higher than that (400° C.) used the Example-1. Moreover, the flyash particles are surface-activated using Ag-clusters instead of Cu-clusters (self-activator) as demonstrated in the Example 1.

$[Ag(NH_3)_2]^+ + e^- \rightarrow Ag^0(ads) + 2NH_{3(aq)}$ \hfill (6)

Figure 10:
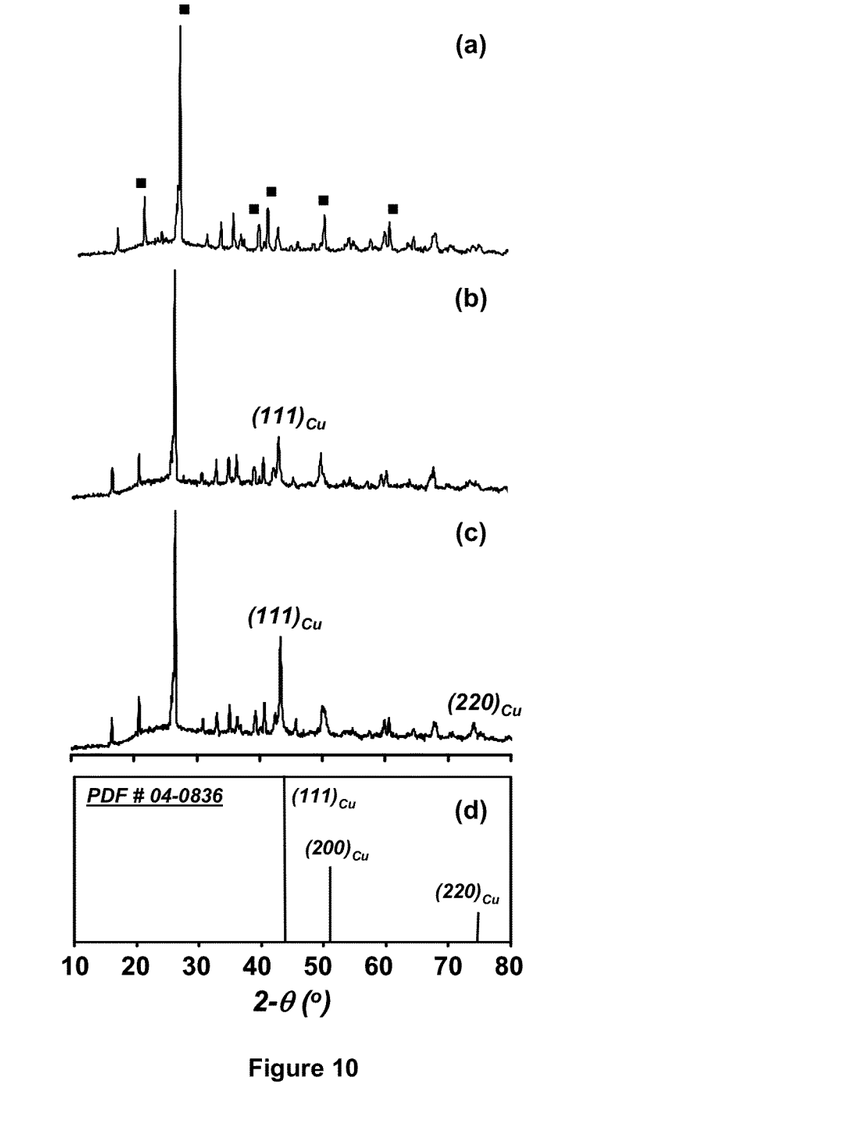
FIG. 10 represents the XRD analysis of the as-received (after calcination at 600° C.) (a) and Cu-coated flyash particles (b,c) obtained using Ag as a surface-activator. In (b) and (c), R-values of 2 and 5 with the calcination temperature of 600° C. have been utilized for the new surface-sensitization of flyash particles. In (a), the peaks marked with '■' represent the diffraction peaks corresponding to the silica (quartz) in the flyash particles (base-ceramic).

The broad-scan XRD patterns, conducted within the 2-θ range of 10-80° using the Cu Kα X-radiation (λ=1.542 Å), as obtained for the as-received flyash particles (after calcination at 600° C. for 2 h) and the Cu-coated flyash particles, are presented in FIG. 10. In FIG. 10(a), the as-received flyash particles (after calcination at 600° C.) are seen to be crystalline in nature. The diffraction peaks corresponding to silica (quartz) have been identified by comparing the diffraction pattern with the JCPDS card #83-0539. The diffraction patterns in FIGS. 10(b) and 10(c), obtained using the Cu-coated flyash particles which are surface-sensitized using two different R-values (2 and 5), show the additional peaks corresponding to $(111)_{Cu}$ and $(220)_{Cu}$, which are identified by comparing the obtained diffraction patterns with the JCPDS card #64-0836, FIG. 10(d). Thus, the XRD analyses clearly show the successful Cu-coating of the as-received flyash particles using the Ag as a surface-activator. Due to higher intensity of the main $(111)_{Cu}$ peak, the flyash particles surface-sensitized with the R-value of 5, FIG. 10(c), possibly exhibit greater thickness of the Cu-coating as compared to that obtained for the particles surface-sensitized with the R-value of 2, FIG. 10(b).

Figure 11:
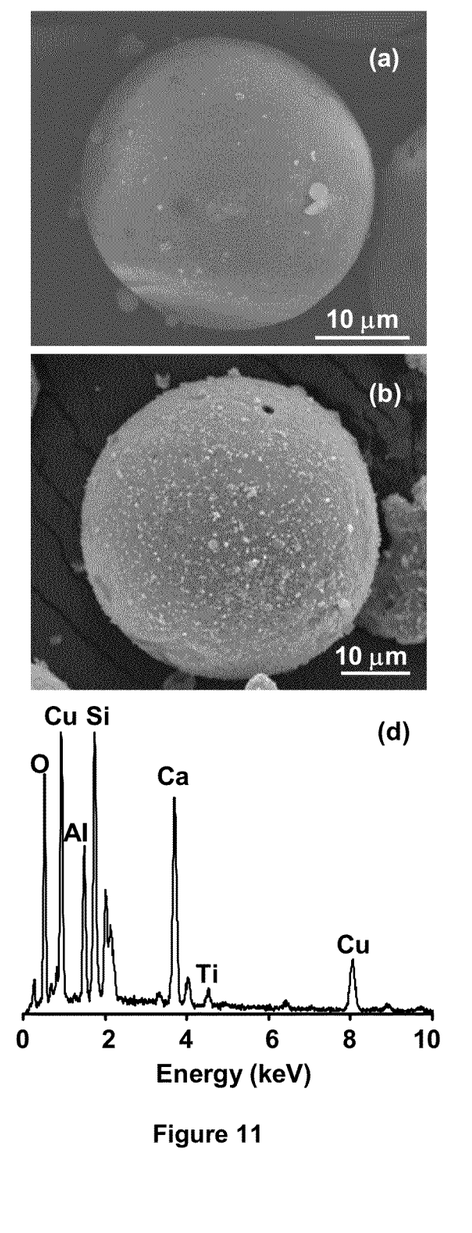

Typical SEM images of one of the spherical-shaped as-received and Cu-coated flyash particles (R=2) are presented in FIGS. 11(a) and 11(b), where change in the featureless surface-morphology of the flyash particles due to the Cu-coating is clearly visible. The Cu-coating appears to be made up of spherical-shaped submicron-sized (~100-200 nm) Cu-particles. The EDX analysis of the Cu-coated flyash particle is shown in FIG. 11(c), which shows an additional peak of Cu when compared with the peaks observed in FIG. 2(b) corresponding to the as-received flyash particles.

Thus, the as-received flyash particles are successfully coated with Cu by surface-sensitizing them with two different R-Values of 2 and 5, and using the calcination temperature of 600° C. with Ag as a surface-activator.

EXAMPLE-3

Figure 12:
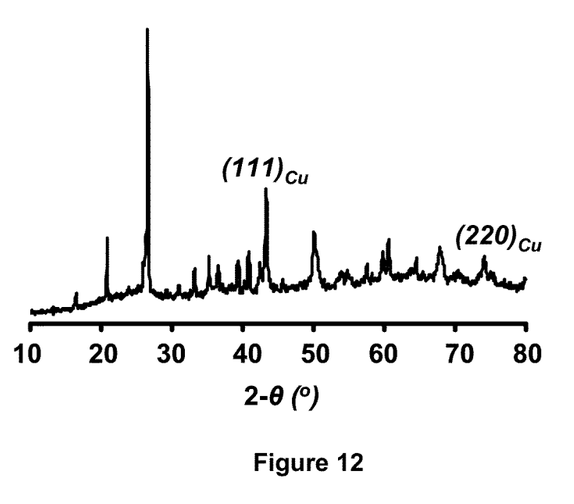
FIG. 12 represents the XRD analysis of the Cu-coated flyash particles obtained using the Ag as a surface-activator. The calcination temperature of 600° C. has been utilized for the new surface-sensitization of flyash obtained using the R-value of 15.

In this example, the as-received flyash particles are surface-sensitized with the R-value of 15, calcined at 600° C., and surface-activated using the Ag. All other processing parameters remain similar to those described in the Example 2. The successful Cu-coating of as-received flyash particles is observed under these processing conditions, which is indicated by change in the color of the conventional electroless bath, within few minutes, from the initial dark blue to the completely transparent. The presence of Cu-coating is also confirmed via XRD analysis, FIG. 12. The diffraction pattern is observed to be similar to those presented in FIGS. 10(b) and 10(c).

EXAMPLE-4

The as-received flyash particles are also surface-sensitized with higher R-values in between 30-150. However, under these processing conditions, the formation of free-$TiO_2$ powder is noted and the successful $TiO_2$-coating, via sol-gel, on the surface of flyash particles could not be obtained due to the homogeneous precipitation of $TiO_2$ powder.

Overall, it is successfully demonstrated via Examples-1, 2, and 3, as described above, that the Cu can be coated on the surface of as-received flyash particles by using the new surface-sensitization and surface-activation processes of this invention. It is to also be noted that, the new surface-sensitization process may be skipped if the as-received flyash itself contains sufficient amount of $TiO_2$ (or any other semiconductor oxide) on its surface.

The main advantages of the present invention are:

1 It provides a new mechanism to surface-sensitize the flyash particles for obtaining the metal-coating, specifically of Cu or Ag.

2 It provides a new mechanism to surface-activate the flyash particles for obtaining the metal-coating, specifically of Cu or Ag.

3 It provides a new application to the sol-gel processed $TiO_2$ as a surface-sensitizer for the utilization of flyash as a value-added product.

4 It provides a new base (substrate) in the form of flyash particles for using the thin film of $TiO_2$ as a photocatalyst to purify the industrial waste-water by decomposing longer chains of organic molecules into smaller ones.

5 It provides an increased possibility of manufacturing the conducting polymers, paints, adhesives, sealers, and resins, which are used for the EMI shielding application, by using economically viable and environmentally friendly new surface-modification process for flyash.

6 It provides an increased possibility of reusing an environmentally hazardous flyash as a value-added product.

The invention claimed is:

1. A process for the surface-modification of flyash containing sufficient amount of titania ($TiO_2$) or any other semiconductor oxide on its surface, wherein said process comprises the steps of:
   i. suspending flyash particles in a surface-activation bath consisting of an aqueous solution of metal-salt (0.1-1.0 g.$l^{-1}$) at pH~10-12 obtained using an aqueous $NH_4OH$ solution (25-28 wt. %);
   ii. stirring the suspension as obtained in step (i) continuously under UV, visible, or solar-radiation for a period ranging between 4-6 h to deposit metal-clusters over the surface of flyash particles;
   iii. separating the flyash particles as obtained in step (ii) via filtration followed by washing with distilled-water to remove unwanted ions from the surface;
   iv. stirring the flyash particles, as obtained in step (iii) in a conventional electroless coating bath containing an aqueous solution of NaOH (5-15 g·$l^{-1}$), $NaKC_4H_4O_6$ (30-60 g·$l^{-1}$), and a metal-salt (1-10 g·$l^{-1}$);
   v. slowly adding 30-40 wt. % HCHO (5-20 ml·$l^{-1}$) as a reducing agent into the suspension as obtained in step (iv);
   vi. stirring the suspension as obtained in step (v) continuously; and
   vii. separating the flyash particles from the suspension as obtained in step (vi) via filtration and drying in an oven at 80-100° C. for 10-12 h to obtain the surface-modified flyash;
   wherein metal-clusters (0.1-3.0 wt. %) are deposited over the flyash particles for surface-activation, metals of said metal-clusters being selected from the group consisting of Cu, Ag, Pd, Au, Pt, and Ni, or any other noble-metal; and metal-coating (1.0-10 wt. %), metals of said metal-coating being selected from the group consisting of Cu and Ag.

2. The process as claimed in claim 1, wherein the metal-salt used in step (i) is selected from the group consisting of nitrate, chloride, and sulfate salts of Cu, Ag, Pd, Au, Pt, or any other noble-metal.

3. The process as claimed in claim 1, wherein in step (i) Cu and Ag metal-salts are used for the surface-activation bath.

4. The process as claimed in claim 1, wherein in step (iv) Cu and Ag metal salts ($CuSO_4$ and $AgNO_3$) are used in the conventional electroless bath.

5. A surface-modified flyash obtained by a process for the surface-modification of flyash containing sufficient amount of titania ($TiO_2$) or any other semiconductor oxide on its surface, wherein said process comprises the steps of:
   i. suspending flyash particles in a surface-activation bath consisting of an aqueous solution of metal-salt (0.1-1.0 g.$l^{-1}$) at pH~10-12 obtained using an aqueous $NH_4OH$ solution (25-28 wt. %);
   ii. stirring the suspension as obtained in step (i) continuously under UV, visible, or solar-radiation for a period ranging between 4-6 h to deposit metal-clusters over the surface of flyash particles;
   iii. separating the flyash particles as obtained in step (ii) via filtration followed by washing with distilled-water to remove unwanted ions from the surface;
   iv. stirring the flyash particles as obtained in step (iii) in a conventional electroless coating bath containing an aqueous solution of NaOH (5-15 g·$l^{-1}$), $NaKC_4H_4O_6$ (30-60 g·$l^{-1}$), and a metal-salt (1-10 g·$l^{-1}$);
   v. slowly adding 30-40 wt. % HCHO (5-20 ml·$l^{-1}$) as a reducing agent into the suspension as obtained in step (iv);
   vi. stirring the suspension as obtained in step (v) continuously; and
   vii. separating the flyash particles from the suspension as obtained in step (vi) via filtration and drying in an oven at 80-100° C. for 10-12 h to obtain the surface-modified flyash;
   wherein the particles comprise metal-clusters (0.1-3.0 wt. %) deposited over the flyash particles for surface-activation, metals of said metal-clusters being selected from the group consisting of Cu, Ag, Pd, Au, Pt, and Ni, or any other noble-metal; and metal-coating (1.0-10 wt. %), metals of said metal-coating being selected from the group consisting of Cu and Ag.

6. The surface-modified flyash as claimed in claim 5, wherein the flyash particles consist of a mixture of $SiO_2$ (40-50 wt. %), $Al_2O_3$ (40-50 wt. %), CaO (1-3 wt. %), and $TiO_2$ (2-4 wt. %).

7. The surface-modified flyash as claimed in claim 5, wherein the flyash particles are solid or hollow.

8. The surface-modified flyash as claimed in claim 5, wherein the surface-modified flyash is used as a catalyst to purify industrial waste-water by decomposing longer chains of organic molecules into smaller ones.

9. The surface-modified flyash as claimed in claim 5, wherein the surface-modified flyash is used as conductive filler in manufacturing conducting polymers.

* * * * *